US00RE41640E

(19) United States
(12) Reissued Patent
Yamamoto et al.

(10) Patent Number: US RE41,640 E
(45) Date of Reissued Patent: Sep. 7, 2010

(54) INFORMATION RECORDING MEDIUM, RECORDING APPARATUS, REPRODUCTION APPARATUS, RECORDING METHOD, REPRODUCTION METHOD AND DEFECT MANAGEMENT METHOD

(75) Inventors: Yoshikazu Yamamoto, Osaka (JP); Motoshi Ito, Osaka (JP); Hiroshi Ueda, Nara (JP)

(73) Assignee: Panasonic Corporation, Osaka (JP)

(21) Appl. No.: 12/114,083

(22) Filed: May 2, 2008

Related U.S. Patent Documents

Reissue of:
(64) Patent No.: 7,042,825
Issued: May 9, 2006
Appl. No.: 10/336,348
Filed: Jan. 3, 2003

(30) Foreign Application Priority Data

Jan. 31, 2002 (JP) ..... 2002-024851

(51) Int. Cl.
*G11B 5/09* (2006.01)

(52) U.S. Cl. ..... 369/59.25; 369/47.14; 369/53.17
(58) Field of Classification Search ..... 369/53.16, 369/53.17, 47.14, 53.15, 275.3
See application file for complete search history.

(56) References Cited

U.S. PATENT DOCUMENTS 5,005,165 A * 4/1991 Yamanaka et al.
5,878,020 A * 3/1999 Takahashi
6,249,884 B1 * 6/2001 Joo
2002/0136537 A1 * 9/2002 Takahashi

FOREIGN PATENT DOCUMENTS

CN 1153978 A 7/1997
CN 11808595 A 5/1998
GB 2 332 555 A * 6/1999

OTHER PUBLICATIONS

European Search Report for corresponding Application No. 03000622.5–1247 dated Jul. 16, 2004.*
Office Action for corresponding Chinese Application No. 200810129617.8 dated Feb. 12, 2010.

* cited by examiner

*Primary Examiner*—Wayne R Young
*Assistant Examiner*—Adam R Giesy
(74) *Attorney, Agent, or Firm*—Renner, Otto, Boisselle & Sklar, LLP

(57) ABSTRACT

Information recording media 101 and 102 usable for either a first recording density D1 or a second recording density D2 each include a user data area 106 in which user data is to be recorded, a first defect management information area 108 in which first defect management information for managing a defect area in the user data area is to be recorded, and a second defect management information area 109 in which second defect management information having an identical content to that of the first defect management information is to be recorded. The first and second defect management information areas 108 and 109 are located such that angles θ1 and θ2 made by start blocks thereof fulfill the relationships of 150°≦θ1≦210° and 150°≦θ2≦210° (θ1: in the case of the first recording density, and θ2: in the case of the second recording density).

15 Claims, 9 Drawing Sheets

INFORMATION RECORDING MEDIUM, RECORDING APPARATUS, REPRODUCTION APPARATUS, RECORDING METHOD, REPRODUCTION METHOD AND DEFECT MANAGEMENT METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an information recording medium, a recording apparatus, a reproduction apparatus, a recording method, a reproduction method, and a defect management method providing improved reliability on information.

2. Description of the Related Art

As large capacity information recording media, optical discs such as, for example, DVDs (Digital Versatile Discs) are known. Along with the increase in the amount of information to be recorded on an information recording medium, high density recording technology and large capacity technology have remarkably improved. As such technologies are improved, it is becoming more and more important to guarantee reliability of recorded information.

FIG. 9 shows a logical structure of a conventional information recording medium 900.

The information recording medium 900 includes a data recording area 901, a first disc information area 902, and a second disc information area 903.

The data recording area 901 includes a user data area 904 in which user data is to be recorded, and a spare area 905. When the user data area 904 has a defect area, the user data which is to be recorded in the defect area is recorded in the spare area 905 instead of a portion of the user data area 904 corresponding to the defect area.

The first disc information area 902 includes a first defect management information area 906 and a second management information area 907, both having defect management information for managing the defect area (for example, a defect block) existing in the user data area 904 and the spare area 905 having the user data recorded therein instead of the defect area.

The second disc information area 903 includes a third defect management information area 908 and a fourth defect management information area 909, both having defect management information for managing the defect area existing in the user data area 904 and the spare area 905 having the user data recorded therein instead of the defect area, as the first disc management information area 902.

The defect area existing in the user data area 904 can be managed by slipping algorithm or linear replacement algorithm (see, for example, ECMA-272 "120 mm DVD Rewritable Disk (DVD-RAM)"). In the case of slipping algorithm, the user data which is to be recorded in the defect area skips the defect area and slips to a subsequent portion of the user data area 904. Thus, the user data is recorded in a portion in the user data area 904 which is not the defect area. In the case of linear replacement algorithm, as shown in FIG. 9, the user data which is to be recorded in the defect area is recorded in the spare area 905 instead of the defect area. In both of the slipping algorithm and linear replacement algorithm, the defect management information for managing the defect area is recorded in each of the first defect medium information area 906, the second defect management information area 907, the third defect management information area 908, and the fourth defect management information area 909.

As described above, the defect management information is multiplex-recorded on an information recording medium since the defect management information is important information. The reasons for this are: (i) the defect management information itself cannot be a target of defect management; and therefore, if the defect management information area, in which the defect management information is to be recorded, has a defect area, the defect management information recorded on the information recording medium cannot be reproduced; and (ii) if the defect management information is lost, the user data recorded on the information recording medium cannot be reproduced. A medium having the defect management information multiplex-recorded thereon enjoys improved reliability, since even if at least one of a plurality of units of defect management information is not reproduceable, the defect management information which has been normally reproduced is used so that the user data can be reproduced without being lost.

FIG. 10 is a schematic view of a conventional information recording medium 1001. The information recording medium 1001 includes a first defect management information area 1002 and a second defect management information area 1003, in each of which defect management information is to be recorded. The first defect management information area 1002 and the second defect management information area 1003 are located proximate to each another. The information recording medium 1001 has a defect area 1004. The defect area 1004 is, for example, a fingerprint, dust, or a scratch. User data cannot be recorded in the defect area 1004. User data recorded in the defect area 1004 cannot be reproduced.

As shown in FIG. 10, the defect area 1004 exists over the first defect management information area 1002 and the second defect management information area 1003. The information recording medium 1001 can include two units of defect management information (i.e., defect management information recorded in the first defect management information area 1002 and defect management information recorded in the second defect management information area 1003), but neither unit of defect management information can be recorded or reproduced due to one defect area 1004. In such a case, the user data recorded in the user area cannot be reproduced and thus the reliability of the user data is lowered.

FIG. 11 is a schematic view of another conventional information recording medium 1101. The information recording medium 1101 includes a first defect management information area 1101 and a second defect management information area 1103, in each of which defect management information is to be recorded. The first defect management information area 1102 and the second defect management information area 1103 are located so as to substantially face each other. The information recording medium 1101 includes a defect area 1104. The defect area 1104 is, for example, a fingerprint, dust, or a scratch.

As shown in FIG. 11, the defect area 1104 exists in the first defect management information area 1102. Namely, information cannot be recorded to or reproduced from the first defect management information area 1102. However, the information can normally be recorded to or reproduced from the second defect management information area 1103. In such a case, the user data recorded in the user data area can be reproduced using the defect management information in the second defect management information area 1103, and therefore the reliability of the user data is not damaged.

As described above with reference to FIGS. 10 and 11, the possibility of defect management information being normally reproduced is raised by locating defect management information areas, in which the defect management information is to be recorded, at discrete positions in the information recording medium. Specifically, it is desirable to locate the defect management information areas so as to face each other as shown in FIG. 11.

In conventional information recording media, the positional arrangement of defect management information areas are determined in accordance with the recording density of the information recording medium. Therefore, the defect management method needs to be changed in accordance with the recording density. In an information recording medium having a fixed positional arrangement of defect management information areas regardless of the recording density, it is not necessary to change the defect management method but there is a risk of the defect management information areas being close to each other.

SUMMARY OF THE INVENTION

An information recording medium according to the present invention is usable for either a first recording density D1 or a second recording density D2 among a plurality of recording densities including the first recording density D1 and the second recording density D2. The information recording medium includes a user data area in which user data is to be recorded; a first defect management information area in which first defect management information is to be recorded, the first defect management information being for managing a defect area existing in the user data area; and a second defect management information area in which second defect management information is to be recorded, the second defect management information having an identical content to that of the first defect management information. The first defect management information area and the second defect management information area are located so as to fulfill the relationships of $150° \leqq \theta 1 \leqq 210°$ and $150° \leqq \theta 2 \leqq 210°$.

$$\theta 1=(D1\times N)/(2\pi\times r)\times 360(\mathrm{Mod}360) \quad (1)$$

$$\theta 2=(D2\times N)/(2\pi\times r)\times 360(\mathrm{Mod}360) \quad (2)$$

θ1 is an angle made by a start block of the first defect management information area and a start block of the second defect management information area when the user data is recorded in the user data area at the first recording density D2. θ2 is an angle made by the start block of the first defect management information area and the start block of the second defect management information area when the user data is recorded in the user data area at the second recording density D2. N is a number of blocks existing between the start block of the first defect management information area and the start block of the second defect management information area. N is a natural number. r is a radial distance of the first defect management information area from the center of the information recording medium.

The first recording density may be 75 mm/block, the second recording density D2 may be 80 mm/block, and the radial distance r may be 60 mm.

An absolute value of the ratio of the difference between the first recording density D1 and the second recording density D2, with respect to the first recording density D1, may be 0.05 to 0.1.

An apparatus for recording information on an information recording medium is provided according to the present invention. The information is recorded at either a first recording density D1 or a second recording density D2 among a plurality of recording densities including the first recording density D1 and the second recording density D2. The information recording medium includes a user data area in which user data is to be recorded; a first defect management information area in which first defect management information is to be recorded, the first defect management information being for managing a defect area existing in the user data area; and a second defect management information area in which second defect management information is to be recorded, the second defect management information having an identical content to that of the first defect management information. The first defect management information area and the second defect management information area are located so as to fulfill the relationships of $150° \leqq \theta 1 \leqq 210°$ and $150° \leqq \theta 2 \leqq 210°$.

$$\theta 1=(D1\times N)/(2\pi\times r)\times 360(\mathrm{Mod}360) \quad (1)$$

$$\theta 2=(D2\times N)/(2\pi\times r)\times 360(\mathrm{Mod}360) \quad (2)$$

θ1 is an angle made by a start block of the first defect management information area and a start block of the second defect management information area when the user data is recorded in the user data area at the first recording density D1. θ2 is an angle made by the start block of the first defect management information area and the start block of the second defect management information area when the user data is recorded in the user data area at the second recording density D2. N is a number of blocks existing between the start block of the first defect management information area and the start block of the second defect management information area. N is a natural number. r is a radical distance of the first defect management information area from the center of the information recording medium. The apparatus includes a head section for recording the information on and reproducing the information from the information recording medium; and a control section for controlling an operation of the head section. The control section controls the operation of the head section, such that the head section reproduces the first defect management information from the first defect management information area, moves by the number of blocks N from the start block of the first defect management information area, and reproduces the second defect management information from the second defect management information area. The control section specifies defect management information to be used, among the first defect management information and the second defect management information, and controls the operation of the head section such that the head section records the user data in the user data area based on the specified defect management information.

The control section may determine whether or not there is another defect area in the user data area; and when determining that there is another defect area, the control section may update the defect management information and control the operation of the head section such that the head section records the user data in a portion of the user data area which is different from the another defect area, based on the updated defect management information.

An apparatus for reproducing information recorded on an information recording medium is provided according to the present invention. The information is recorded at either a first recording density D1 or a second recording density D2 among a plurality of recording densities including the first recording density D1 and the second recording density D2. The information recording medium includes a user data area in which user data is to be recorded; a first defect management information area in which first defect management information is to be recorded, the first defect management information being for managing a defect area existing in the user data user; and a second defect management information area in which second defect management information is to be recorded, the second defect management information having an identical content to that of the first defect management information. The first defect management information area and the second defect management information area are located so as to fulfill the relationships of $150° \leqq \theta 1 \leqq 210°$ and $150° \leqq \theta 2 \leqq 210°$.

$$\theta 1=(D1\times N)/(2\pi\times r)\times 360(\mathrm{Mod}360) \quad (1)$$

$$\theta 2=(D2\times N)/(2\pi\times r)\times 360(\mathrm{Mod}360) \quad (2)$$

θ1 is an angle made by a start block of the first defect management information area and a start block of the second defect management information area when the user data is recorded in the user data area at the first recording density D1. θ2 is an angle made by the start block of the first defect management information area and the start block of the second defect management information area when the user data is recorded in the user data area at the second recording density D2. N is a number of blocks existing between the start block of the first defect management information area and the start block of the second defect management information area. N is a natural number. r is a radial distance of the first defect management information area from the center of the information recording medium. The apparatus includes a head section for reproducing the information recorded on the information recording medium; and a control section for controlling an operation of the head section. The control section controls the operation of the head section, such that the head section reproduces the first defect management information from the first defect management information area, moves by the number of blocks N from the start block of the first defect management information area, and reproduces the second defect management information from the second defect management information area. The control section specifies defect management information to be used, among the first defect management information and the second defect management information, and controls the operation of the head section such that the head section reproduces the user data from the user data area based on the specified defect management information.

A method for recording information on an information recording medium is provided according to the present invention. The information is recorded at either a first recording density D1 or a second recording density D2 among a plurality of recording densities including the first recording density D1 and the second recording density D2. The information recording medium includes a user data area in which user data is to be recorded; a first defect management information area in which first defect management information is to be recorded, the first defect management information being for managing a defect area existing in the user data area; and a second defect management information area in which second defect management information is to be recorded, the second medium defect information having an identical content to that of the first defect management information. The first defect management information area and the second defect management information area are located so as to fulfill the relationships of $150° \leqq \theta 1 \leqq 210°$ and $150° \leqq \theta 2 \leqq 210°$.

$$\theta 1=(D1\times N)/(2\pi\times r)\times 360(\mathrm{Mod}360) \quad (1)$$

$$\theta 2=(D2\times N)/(2\pi\times r)\times 360(\mathrm{Mod}360) \quad (2)$$

θ1 is an angle made by a start block of the first defect management information area and a start block of the second defect management information area when the user data is recorded in the user data area at the first recording density D1. θ2 is an angle made by the start block of the first defect management information area and the start block of the second defect management information area when the user data is recorded in the user data area at the second recording density D2. N is a number of blocks existing between the start block of the first defect management information area and the start block of the second defect management information area. N is a natural number. r is a radial distance of the first defect management information area from the center of the information recording medium. The method includes the steps of reproducing the first defect management information from the first defect management information area; moving the head section, for recording information on and reproducing information from the information recording medium, by the number of blocks N from the start block of the first defect management information area; reproducing the second defect management information from the second defect management information area; specifying the defect management information to be used, among the first detect management information and the second defect management information; and recording the user data in the user data area based on the specified defect management information.

The step of recording may include the steps of determining whether or not there is another defect area in the user data area; updating the defect management information when it is determined that there is another defect area; and recording the user data in a portion of the user data area which is different from the another defect area, based on the updated defect management information.

A method for reproducing information recorded on an information recording medium is provided according to the present invention. The information is recorded at either a first recording density D1 or a second recording density D2 among a plurality of recording densities including the first recording density D1 and the second recording density D2. The information recording medium includes a user data area in which user data is to be recorded; a first defect management information area in which first defect management information is to be recorded, the first defect management information being for managing a defect area existing in the user data area; and a second defect management information area in which second defect management information is to be recorded, the second defect management information having an identical content to that of the first defect management information. The first defect management information area and the second defect management information area are located so as to fulfill the relationships of $150° \leqq \theta 1 \leqq 210°$ and $150° \leqq \theta 2 \leqq 210°$.

$$\theta 1=(D1\times N)/(2\pi\times r)\times 360(\mathrm{Mod}360) \quad (1)$$

$$\theta 2=(D2\times N)/(2\pi\times r)\times 360(\mathrm{Mod}360) \quad (2)$$

θ1 is an angle made by a start block of the first defect management information area and a start block of the second defect management information area when the user data is recorded in the user data area at the first recording density D1. θ2 is an angle made by the start block of the first defect management information area and the start block of the second defect management information area when the user data is recorded in the user data area at the second recording density D2. N is a number of blocks existing between the start block of the first defect management information area and the start block of the second defect management information area. N is a natural number. r is a radial distance of the first defect management information area from the center of the information recording medium. The method includes the steps of reproducing the first defect management information from the first defect management information area; moving the head section, for recording information recorded on the information recording medium, by the number of blocks N from the start block of the first defect management information area; reproducing the second defect management information from the second defect management information area; specifying the defect management information to be used, among the first defect management information and the second defect management information; and reproducing the user data from the user data area based on the specified defect management information.

A defect management method for managing a defect area existing in an information recording medium is provided according to the present invention. The information recording medium is usable for either a first recording density D1 or a second recording density D2 among a plurality of recording densities including the first recording density D1 and the second recording density D2. The information recording medium includes a user data area in which user data is to be recorded; a first defect management information area in which first defect management information is to be recorded, the first defect management information being for managing a defect area existing in the user data area; and a second defect management information area in which second defect management information is to be recorded, the second defect management information having an identical content to that of the first defect management information. The first defect management information area and the second defect management information area are located so as to fulfill the relationships of $150° \leqq \theta 1 \leqq 210°$ and $150° \leqq \theta 2 \leqq 210°$.

$$\theta 1 = (D1 \times N)/(2\pi \times r) \times 360 (\mathrm{Mod}360) \quad (1)$$

$$\theta 2 = (D2 \times N)/(2\pi \times r) \times 360 (\mathrm{Mod}360) \quad (2)$$

θ1 is an angle made by a start block of the first defect management information area and a start block of the second defect management information area when the user data is recorded in the user data area at the first recording density D1. θ2 is an angle made by the start block of the first defect management information area and the start block of the second defect management information area when the user data is recorded in the user data area at the second recording density D2. N is a number of blocks existing between the start block of the first defect management information area and the start block of the second defect management information area. N is a natural number. r is a radial distance of the first defect management information area from the center of the information recording medium. The defect management method includes the steps of updating defect management information; recording the updated defect management information in the first defect management information area as the first defect management information; moving the head section, for recording information on and reproducing information from the information recording medium, by the number of blocks N from the start block of the first defect management information area; and recording the updated defect management information in the second defect management information area as second defect management information.

The first recording density D1 may be 75 mm/block, the second recording density D2 may be 80 mm/block, and the radial distance r may be 60 mm.

An absolute value of the ratio of the difference between the first recording density D1 and the second recording density D2, with respect to the first recording density D1, may be 0.05 to 0.1.

Thus, the invention described herein makes possible the advantages of providing a highly reliable information recording medium having defect management information areas located so as to face each other regardless of the recording density and allowing defects thereof to be managed by a fixed defect management method, an apparatus and method for recording information on such an information recording medium, an apparatus and method for reproducing information from such an information recording medium, and a defect management method for managing a defect of such an information recording medium.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

(1) Information Recording Medium

Figure 1:
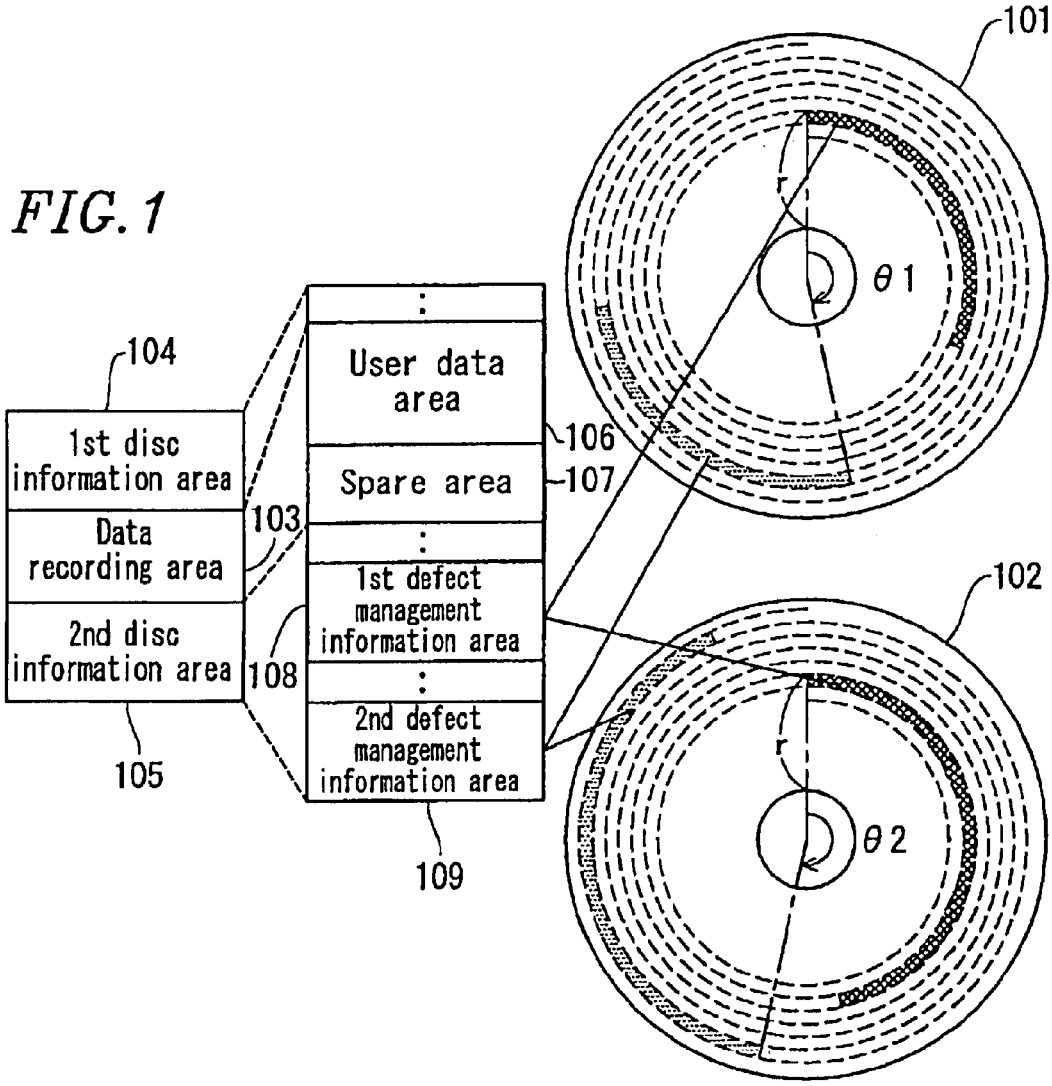
FIG. 1 shows a logical structure and a schematic view of a first information recording medium 101 and a second information recording medium 102 according to a first example of the present invention.

FIG. 1 shows a logical structure and a schematic view of a first information recording medium 101 and a second information recording medium 102 according to a first example of the present invention.

The first information recording medium 101 is an exemplary medium usable for a first recording density D1 among a plurality of recording densities. The second information recording medium 102 is an exemplary medium usable for a second recording density D2 among the plurality of recording densities. D1 and D2 are different from each other. The first recording density D1 and the second recording density D2 preferably have such a relationship that an absolute value of the ratio of the difference between the first recording density D1 and the second recording density D2, with respect to the first recording density D1, is 0.05 to 0.1. The first information recording medium 101 and the second information recording medium 102 each have a sector structure. In this specification, the minimum unit of recording/reproduction is one sector or a few sectors. Hereinafter, the minimum unit of recording/reproduction will be referred to as the "block", and the number assigned to each block in an ascending order in the recording/reproduction direction will be referred to as the "block number".

The first information recording medium 101 and the second information recording medium 102 both include a data recording area 103, a first disc information area 104, and a second disc information area 105.

The data recording area 103 includes a user data area 106 in which user data is to be recorded, and a spare area 107. When the user data area 106 has a defect area, the user data which is to be recorded in the defect area is recorded in the spare area 107 instead of a portion of the user data area 106 corresponding to the defect area.

The second disc information area 105 includes a first defect management information area 108 having first defect management information and a second defect management information area 109 having second defect management information, both for managing a defect area (for example, a defect block) existing in the user data area 106 and the spare area 107 having the user data recorded therein instead of the defect area. While defect management is normally performed, the content in the first defect management information and the content in the second defect management information are the same.

As shown in FIG. 1, in the first information recording medium 101 usable for the first recording density D1, the position of the start block of the first defect management information area 108 and the position of the start block of the second defect management information area 109 substantially face each other with reference to the center of the first information recording medium 101.

Similarly, in the second information recording medium 102 usable for the second recording density D2, the position of the start block of the first defect management information area 108 and the position of the start block of the second defect management information area 109 substantially face each other with reference to the center of the second information recording medium 102.

In this specification, the expression "substantially face" encompasses the case where the angle θ made by the start block of the first defect management information area 108 and the start block of the second defect management information area 109 is 180° and also the case where such an angle θ is not 180° but the information can be recorded to and reproduced from the first defect management information area 108 and the second defect management information area 109 despite one defect. This condition is fulfilled when the angle θ is in the range of $150° \leqq \theta \leqq 210°$.

Where the block number of the start block of the first defect management information area 108 of the first information recording medium 101 is S1, the block number of the start block of the second defect management information area 109 of the first information recording medium 101 is E1, the block number of the start block of the first defect management information area 108 of the second information recording medium 102 is S2, and the block number of the start block of the second defect management information area 109 of the second information recording medium 102 is E2, $E1-S1=E2-S2<N$ (N is a constant natural number).

The principle based on which the above relationship is fulfilled in both an information recording medium usable for the first recording density D1 and an information recording medium usable for the second recording density D2 among the plurality of recording densities will be described.

In the first information recording medium 101 usable for first recording density D1 (mm/block), where an angle made by the start block of the first defect management information area 108 and the start block of the second defect management information area 109 is θ1 (°), the number of blocks existing between the start block of the first defect management information area 108 and the start block of the second defect management information area 109 is N (natural number), and the radial distance of the first defect management information area 108 from the center of the first information recording medium 101 is r (mm), the following relationship is valid.

$$\theta 1=(D1\times N)/(2\pi\times r)\times 360(\mathrm{Mod}360) \quad (1)$$

Similarly, in the second information recording medium 102 usable for the second recording density D2 (mm/block), where an angle made by the start block of the first defect management information area 108 and the start block of the second defect management information area 109 is θ2 (°), the number of blocks existing between the start block of the first defect management information area 108 and the start block of the second defect management information area 109 is N (natural number), and the radial distance of the first defect management information area 108 from the center of the second information recording medium 102 is r (mm), the following relationship is valid.

$$\theta 2=(D2\times N)/(2\pi\times r)\times 360(\mathrm{Mod}360) \quad (2)$$

In order to locate the first defect management information area 108 and the second defect management information area 109 so as to substantially face each other regardless of whether the first recording density D1 or the second recording density D2 is used, the number of blocks N which fulfills the relationships of $150° \leqq \theta 1 \leqq 210°$ and $150° \leqq \theta 2 \leqq 210°$ is found. Thus, regardless of whether the first recording density D1 or the second recording density D2 is used, the first defect management information area 108 and the second defect management information area 109 are located so that the start block of the former is away from the start block of the latter by N blocks.

As long as the information recording medium is usable for either the first recording density D1 or the second recording density D2 among the plurality of recording densities, the defect management information areas in such an information recording medium face each other regardless of whether the first recording density D1 or the second recording density D2 is used; and it is not necessary to change the defect management method in accordance with the recording density. Owing to such a structure, an information recording medium which is highly reliable and can be handled by an easy defect management method is provided.

SPECIFIC EXAMPLE 1

Next, the information recording medium according to the first example will be described by way of a specific example.

The first recording density D1 was 75 mm/block, the second recording density D2 was 80 mm/block, and the radial distance r was 60 mm. In this case, the expressions (1) and (2) mentioned above are as follows:

$$\theta 1=(75\times N)(2\pi\times 60)\times 360(\mathrm{Mod}360) \quad (1')$$

$$\theta 2=(80\times N)(2\pi\times 60)\times 360(\mathrm{Mod}360) \quad (2')$$

θ1 and θ2 were obtained from expressions (1') and (2') with the range of N being 1 through 100.

Figure 2:
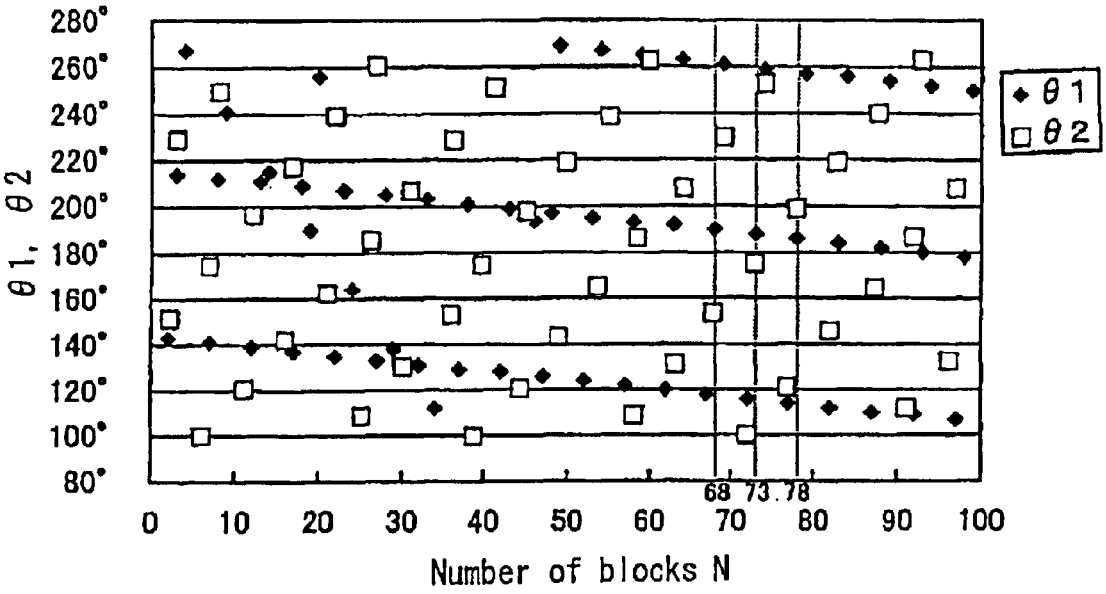
FIG. 2 is a graph illustrating the relationship between the number of blocks N, and θ1 and θ2 according to the first example of the present invention.

FIG. 2 is a graph illustrating the relationship between the number of blocks N, and θ1 and θ2 according to the first example. More specifically, FIG. 2 shows θ1 (♦) fulfilling 90°=θ1≦270° and θ2 (□) fulfilling 90°≦θ2≦270° plotted when N is in the range of 1 through 100. From FIG. 2, it was found that the relationships of 150°≦θ1≦210° and 150°≦θ2≦210° are fulfilled when the number of blocks N is 68, 73 and 78.

Accordingly, when the number of blocks N existing between the start block of the first defect management information area 108 and the start block of the second defect management information area 109 is 68, 73 or 78, the first defect management information area 108 and the second defect management information area 109 substantially face each other, regardless of whether the first recording density (D1=75 mm/block) or the second recording density (D2=80 mm/block) is used.

In the specific example 1, N is in the range of 1 through 100, but N is not limited to this range. Even when N exceeds 100, the number of blocks N (N>100) which fulfills the relationships of 150°≦θ1≦210° and 150°≦θ2≦210° can be obtained by finding θ1 and θ2 in a similar manner.

In the first example, linear replacement algorithm is described, by which when a defect area exists in the user data area 106, the user data which is to be recorded in the defect area is recorded in the spare area 107 instead of the portion of the user data area 106 corresponding to the defect area. The present invention is not limited to this. Slipping algorithm is usable without providing the spare area 107 in the information recording medium. In this case, the defect management information only manages the defect area existing in the user data area 106.

(2) Reproduction/Recording/Defect Management

Figure 3:
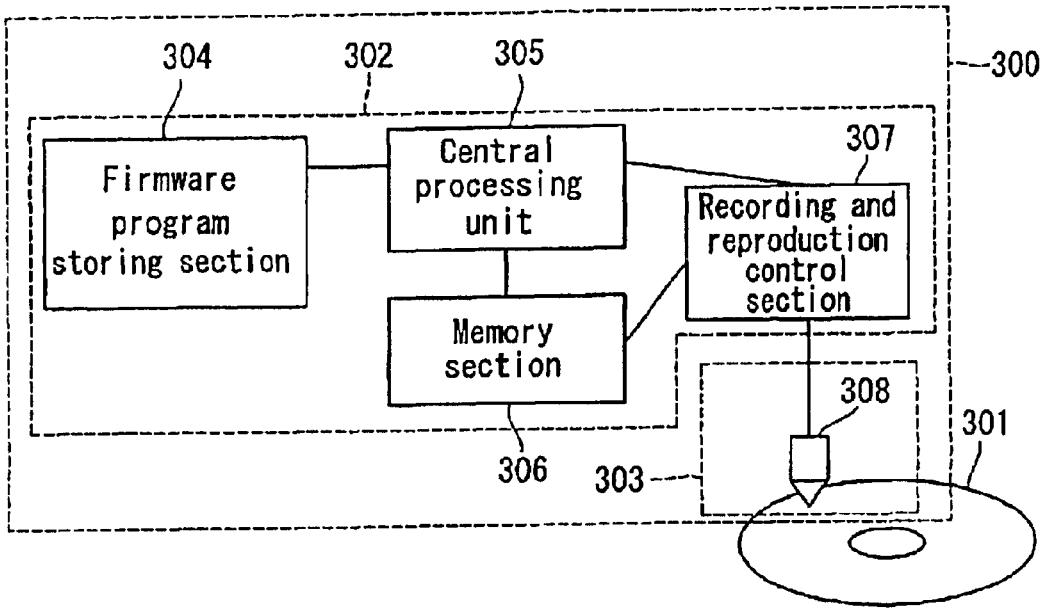
FIG. 3 is a block diagram of a recording and reproduction apparatus 300 according to the first example of the present invention.

FIG. 3 is a block diagram of a recording and reproduction apparatus 300 according to the first example of the present invention. The recording and reproduction apparatus 300 records information on an information recording medium 301 according to the first example and/or reproduces information recorded on the information recording medium 301.

The recording and reproduction apparatus 300 includes a control section 302 and a head section 303.

The control section 302 includes a firmware program storing section 304, a central processing unit 305, a memory section 306, and a recording and reproduction control section 307. The firmware program storing section 304 stores an operation program for the central processing unit 305. The central processing unit 305 interprets and executes the operation program stored in the firmware program storing section 304. The memory section 306 stores information to be recorded on the information recording medium 301 and/or stores information reproduced from the information recording medium 301. The memory section 306 can be, for example, a random access memory (RAM). The recording and reproduction control section 307 reads, from the memory section 306, information to be recorded on the information recording medium 301 and/or writes, in the memory section 306, information reproduced from the information recording medium 301.

The head section 303 includes a head 308. The head 308 emits laser light so as to write information on the information recording medium 301 as a signal and/or read information written on the information recording medium 301 as a signal.

<Reproduction>

Next, a reproduction operation of the recording and reproduction apparatus 300 will be described.

The central processing unit 305 interprets and executes a program regarding a reproduction operation in the operation program stored in the firmware program storing section 304. Based on the program, the central processing unit 305 instructs the recording and reproduction control section 307 to reproduce the first and second defect management information from the first defect management information area 108 and the second defect management information area 109 of the information recording medium 301.

The recording and reproduction control section 307 instructs the head 308 of the head section 303 to reproduce first management information from the first defect management information area 108 of the information recording medium 301. The head 308 reproduces the first defect management information, and then the recording and reproduction control section 307 stores the reproduced first detect management information in the memory section 306.

The number of blocks existing between the start block of the first defect management information area 108 and the start block of the second defect management information area 109 is N. Therefore, the recording and reproduction control section 307 moves the head 308 by N blocks from the start block of the first defect management information area 108 in the ascending direction of the block number.

The recording and reproduction control section 307 instructs the head 308 to reproduce second management information from the second defect management information area 109. The head 308 reproduces the second defect management information, and then the recording and reproduction control section 307 stores the reproduced second defect management information in the memory section 306.

The central processing unit 305 reads the first defect management information and the second defect management information stored in the memory section 306, and specifies which unit of defect management information is the defect management information to be used. The defect management information to be used can be specified by, for example, referring to a value of a first update counter included in the first defect management information and a value of a second update counter included in the second defect management information. When the value of the first update counter matches the value of the second update counter, either defect management information can be adopted. When the value of the first update counter does not match the value of the second update counter, the defect management information including the update counter having a larger value is adopted. The above-mentioned method for specifying the defect management information is merely exemplary.

Based on the specified defect management information, the central processing unit 305 instructs the recording and reproduction control section 307 to reproduce the user data from the information recording medium 301. The recording and reproduction control section 307 instructs the head 308 to reproduce the user data from the user data area 106, and when the user data area 106 includes a defect area, also from the spare area 107. The recording and reproduction control section 307 stores the user data reproduced in this manner in the memory section 306.

Next, a processing procedure of reproducing information recorded on the information recording medium according to the first example will be described.

Figure 4:
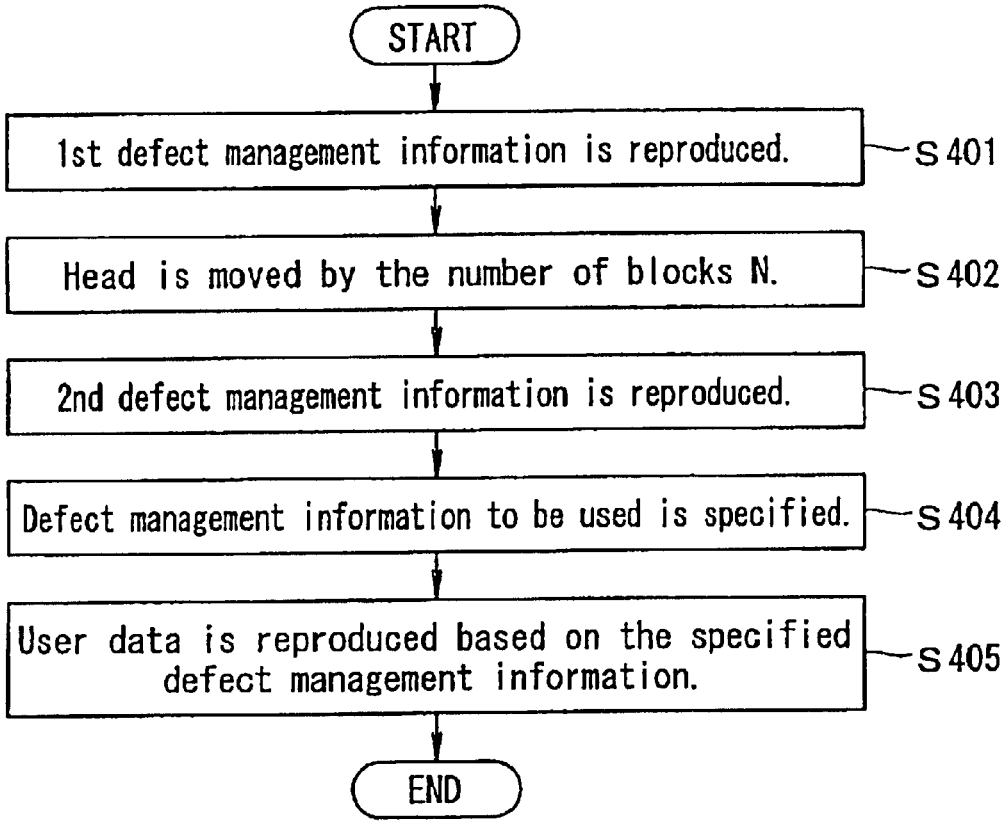
FIG. 4 shows a reproduction processing procedure according to the first example of the present invention.

FIG. 4 shows a reproduction processing procedure according to the first example. The reproduction processing is executed by the control section 302. Hereinafter, the reproduction processing procedure will be described step by step.

Step S401: The first defect management information is reproduced from the first defect management information area 108. The reproduced first defect management information is stored in the memory section 306.

Step S402: The head 308 moves by N blocks from the start block of the first defect management information area 108 in the ascending direction of the block number, in order to reproduce the second defect management information. According to the first example, the number of blocks existing between the start block of the first defect management information area 108 and the start block of the second defect management information area 109 is N, regardless of whether the first recording density D1 or the second recording density D2 is used. Therefore, the head 308 can direct the laser light to the start block of the second defect management information area 109 without fail, and thus does not scan a wrong area as the second defect management information area 109.

Step S403: The second defect management information is reproduced from the second defect management information area 109. The reproduced second defect management information is stored in the memory section 306.

Step S404: The defect management information to be used is specified from the reproduced first defect management information and the reproduced second defect management information by the central processing unit 305. The defect management information to be used can be specified using the update counters as described above.

Step S405: The user data is reproduced based on the specified defect management information. More specifically, based on the specified defect management information, the head 308 reproduces the user data area 106 and, when the user data area 106 includes a defect area, also from the spare area 107.

In the first example, linear replacement algorithm is described, by which when a defect area exists in the user data area 106, the user data which is to be recorded in the defect area is recorded in the spare area 107 instead of the portion of the user data area 106 corresponding to the defect area. The present invention is not limited to this. Slipping algorithm is usable without providing the spare area 107 in the information recording medium. In this case, in step S405, the head 308 reproduces the user data from the user data area 106 based on the specified defect management information.

<Recording>

Next, returning to FIG. 3, a recording operation of the recording and reproduction apparatus 300 will be described.

The central processing unit 305 interprets and executes a program regarding a recording operation in the operation program stored in the firmware program storing section 304. Based on the program, the central processing unit 305 instructs the recording and reproduction control section 307 to reproduce information in the first defect management information area 108 and the second defect management information area 109 of the information recording medium 301. The operation of reproducing the first defect management information and the second defect management information and specifying the defect management information to be used is the same as that of the reproduction operation, and will not be described below.

Based on the specified defect management information, the central processing unit 305 instructs the recording and reproduction control section 307 to record, on the information recording medium 301, the information to be recorded which is stored in the memory section 306. The recording and reproduction control section 307 reads the information to be recorded from the memory section 306, and instructs the head 308 to record the read information in the user data area 106.

While the head 308 records the information in the user data area 106, the central processing unit 305 determines whether or not there is another defect area in the user data area 106.

When the central processing unit 305 determines that there is another defect area in the user data area 106, the central processing unit 305 updates the defect management information stored in the memory section 306. Next, based on the updated defect management information, the central processing unit 305 instructs the recording and reproduction control section 307 to record the user data on the information recording medium 301. Based on the updated defect management information, the recording and reproduction control section 307 instructs the head 308 to record, in the spare area 107, the information to be recorded in the defect area.

When the central processing unit 305 determines that there is no more defect area in the user data area 106, the recording processing is terminated. The above-described determination on whether or not there is another defect area is performed by comparing a signal reproduced immediately after the user data is recorded with a signal showing the user data to be recorded. When these signals match each other, it is determined that the user data has been normally recorded in the user data area 106. When these signals do not match each other, it is determined that the user data has not been normally recorded in the user data area 106 and there is another defect area in the user data area 106. Such a determination is performed block by block.

Next, a processing procedure of recording information on the information recording medium according to the first example will be described.

Figure 5:
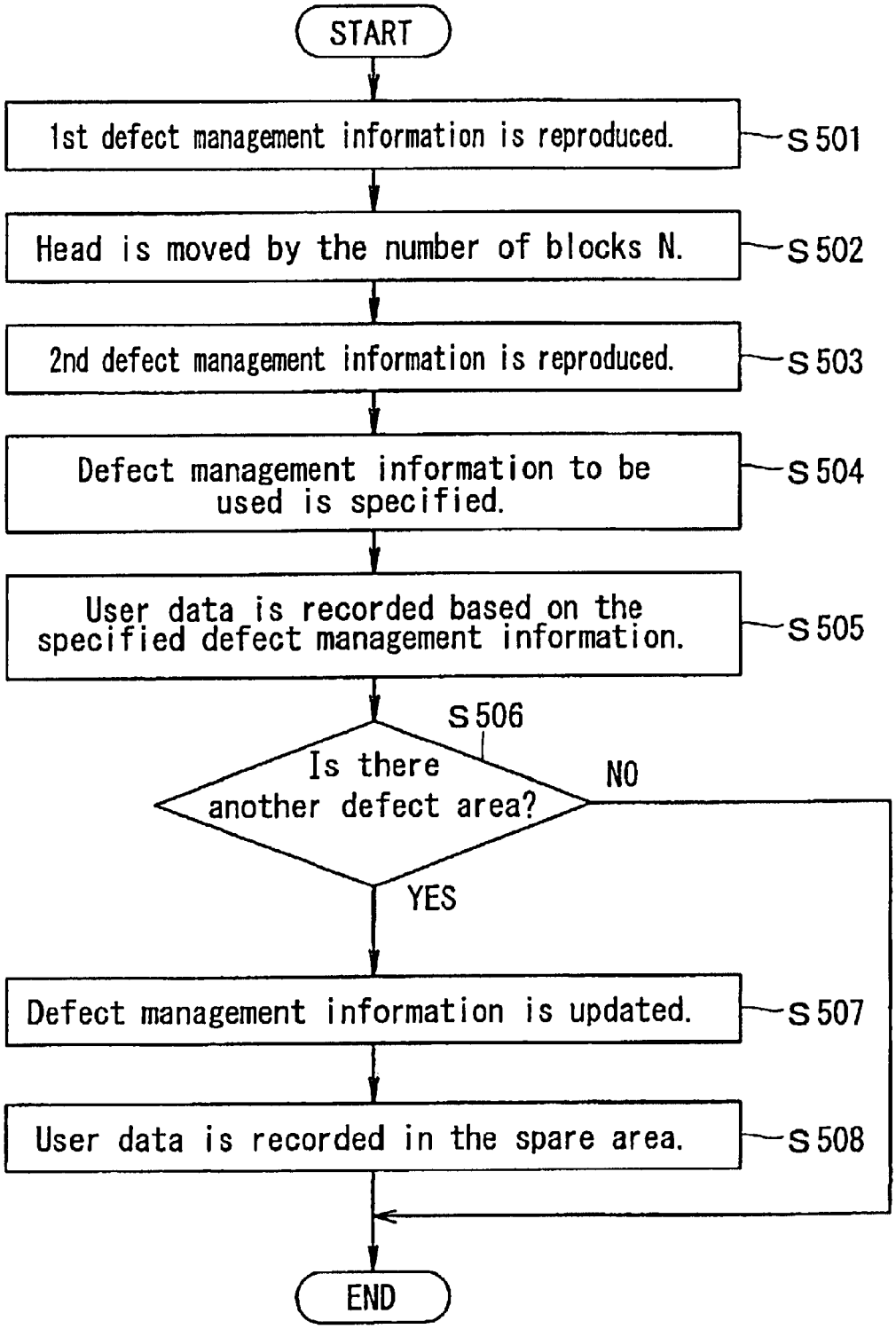
FIG. 5 shows a recording processing procedure according to the first example of the present invention.

FIG. 5 shows a recording processing procedure according to the first example. The recording processing is executed by the control section 302. Hereinafter, the recording processing procedure will be described step by step.

Steps S501 through S504 are the same as those of steps S401 through S404 in FIG. 4, and will not be described below.

Step S505: Based on the specified defect management information, the user data is recorded on the information recording medium 301.

Step S506: It is determined whether or not there is another defect area in the user data area 106. When it is determined that there is another defect area in the user data area 106, the processing goes to step S507. When it is determined that there is no more defect area in the user data area 106, the user data is normally recorded in the user data area 106, and the recording processing is terminated.

Step S507: When it is determined that there is another defect area in the user data area 106, the defect management information specified in step S504 is updated. The update of the defect management information is performed by, for example, newly recording the information regarding the defect area in the user data area 106 and information regarding the spare area 107 in which the information is recorded instead of the another defect area (for example, a spare list). The information regarding the defect area in the user data area 106 and the information regarding the spare area 107 can be, for example, block position information.

Step S508: Based on the updated defect management information, the user data, which is to be recorded in the another defect area, is recorded in the spare area.

In the first example, linear replacement algorithm is described, by which when a defect area exists in the user data area 106, the user data which is to be recorded in the defect area is recorded in the spare area 107 instead of the portion of the user data area 106 corresponding to the defect area. The present invention is not limited to this. Slipping algorithm is usable without providing the spare area 107 in the information recording medium. In this case, the defect management information is updated in step S507 by newly recording the information regarding the defect area in the user data area 106 and information regarding a portion of the user data area 106 in which the information is recorded instead of the another defect area (for example, a slip list).

<Defect Management>

Next, returning again to FIG. 3, a defect management operation of the recording and reproduction apparatus 300 will be described. The defect management operation is performed when it is determined in step S507 in FIG. 5 that there is another defect area in the user data area 106. The defect management operation is the same as that of the recording operation described with reference to FIG. 3, up to the point where the defect management information is updated.

When the defect management information is updated, the central processing unit 305 instructs the recording and reproduction control section 307 to record the updated defect management information on the information recording medium 301.

The recording and reproduction control section 307 instructs the head 308 of the head section 303 to record the updated defect management information in the first defect management information area 108 of the information recording medium 301 as first defect management information. The head 308 records the updated defect management information in the first defect management information area 108 as the first defect management information.

According to the first example, the number of blocks existing between the start block of the first defect management information area 108 and the start block of the second defect management information area 109 is N. Therefore, the recording and reproduction control section 307 moves the head 308 by N blocks from the start block of the first defect management information area 108 in the ascending direction of the block number. In consequence, the head 308 can direct the laser light to the start block of the second defect management information area 109 without fail, and thus does not record the updated defect management information in a wrong area as the second defect management information area 109.

The recording and reproduction control section 307 instructs the head 308 to record the updated defect management information in the second management information area 109 as second defect management information.

Next, a defect management processing procedure according to the first example will be described.

Figure 6:
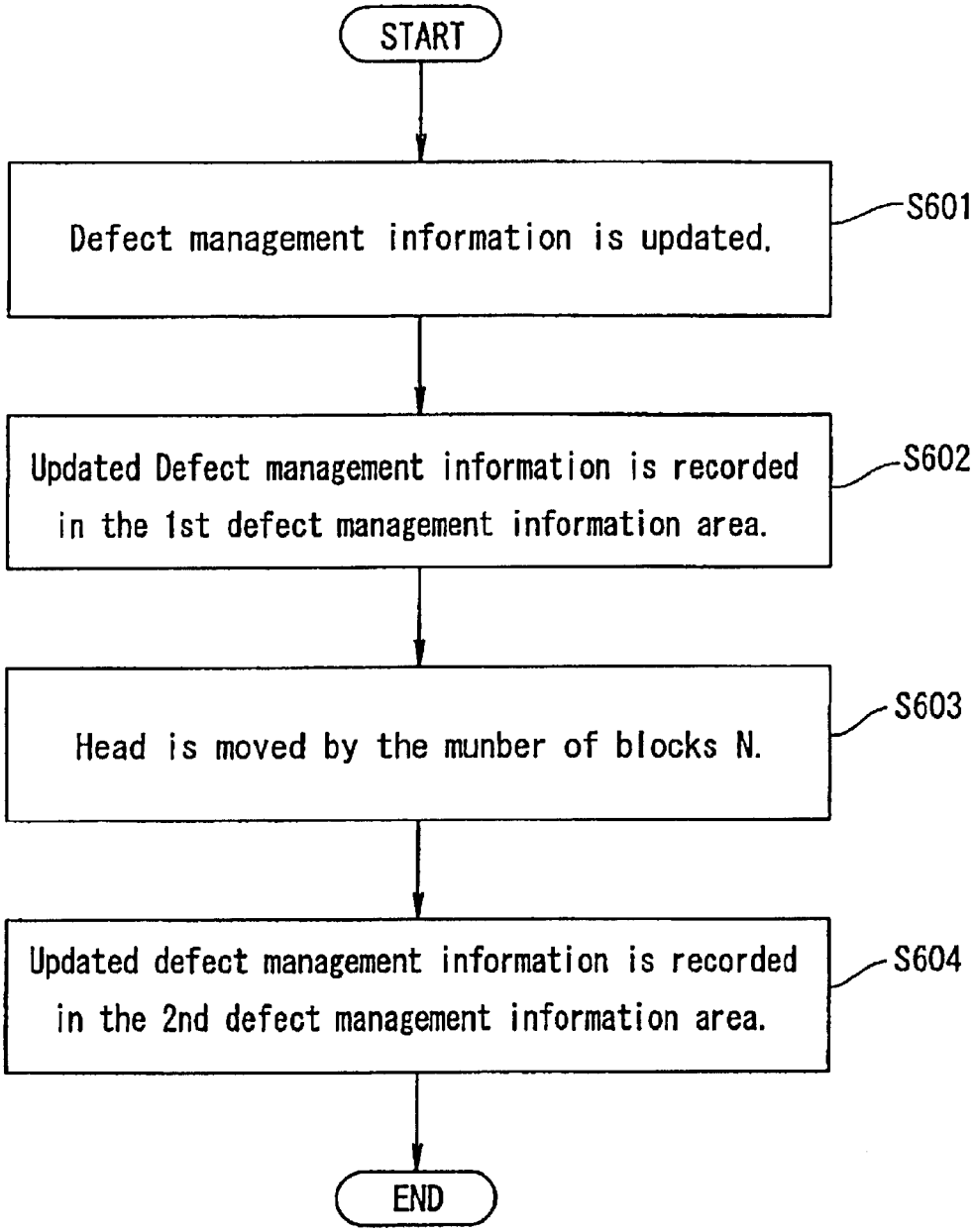
FIG. 6 shows a defect management processing procedure according to the first example of the present invention.

FIG. 6 shows a defect management processing procedure according to the first example. The defect management processing is executed by the control section 302. Hereinafter, the defect management processing procedure will be described step by step.

Step S601 is the same as those of step S507 in FIG. 5, and will not be described below.

Step S602: The updated defect management information is recorded in the first defect management information area 108 as the first defect management information.

Step S603: The head 308 moves by N blocks from the start block of the first defect management information area 108 in the ascending direction of the block number, in order to record the updated defect management information in the second defect management information area 109.

Step S604: The updated defect management information is recorded in the second defect management information area 109 as the second defect management information.

According to the first example, regardless of whether the first recording density D1 or the second recording density D2 is used, the first defect management information area 108 and the second defect management information area 109 are located such that the start blocks thereof are always away from each other by N blocks. Accordingly, an identical recording method, reproduction method and defect management method can be used for an information recording medium usable for either the first recording density D1 or the second recording density D2 among the plurality of recording densities.

EXAMPLE 2

In the first example, an information recording medium usable for either the first recording density D1 or the second recording density D2 among a plurality of recording densities has been described. The present invention is not limited to this. In a second example of the present invention, an information recording medium usable for one of three or more recording densities will be described.

Figure 7:
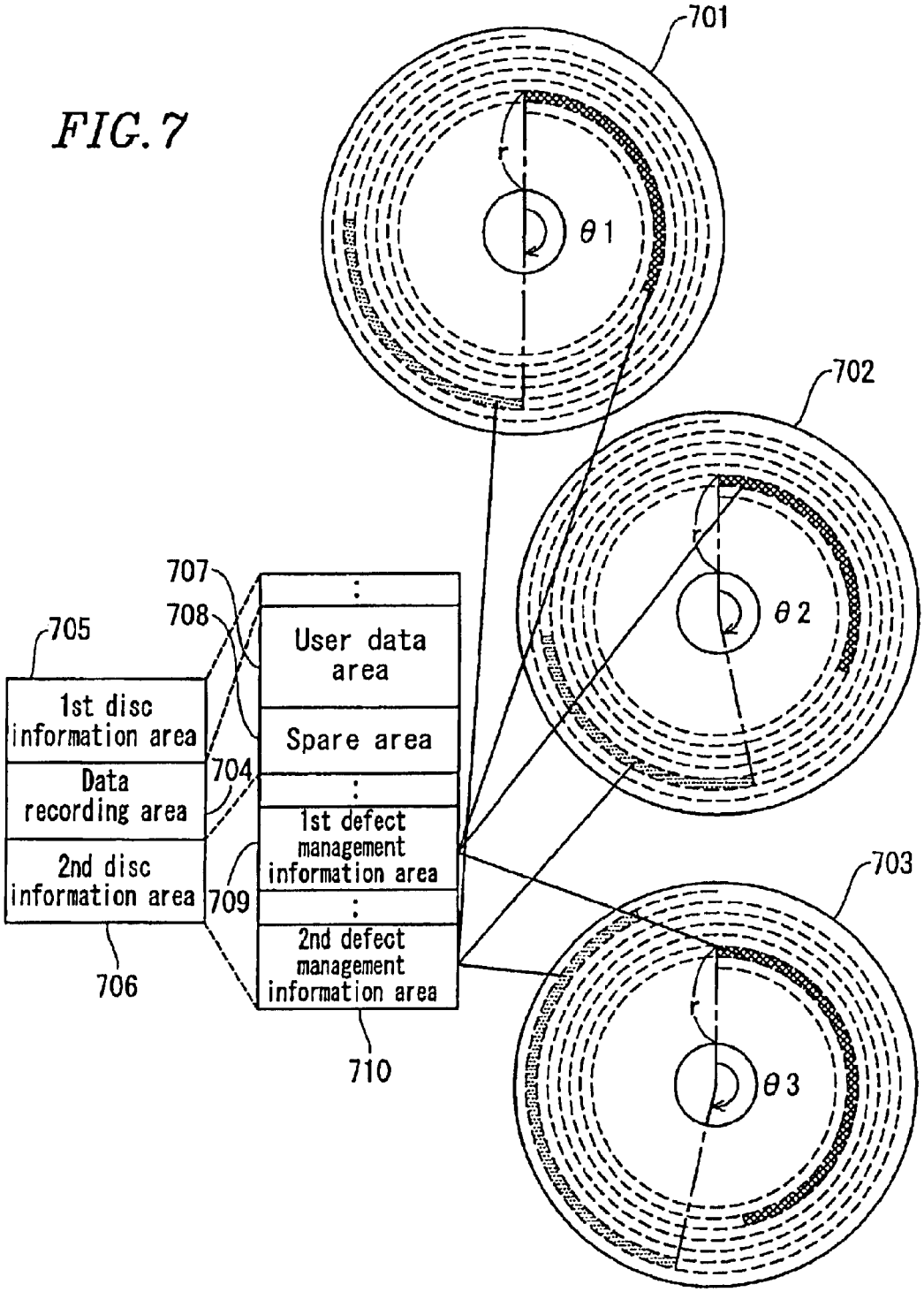
FIG. 7 shows a logical structure and a schematic view of a first information recording medium 701, a second information recording medium 702 and a third information recording medium 703 according to a second example of the present invention.

FIG. 7 shows a logical structure and a schematic view of a first information recording medium 701, a second information recording medium 702, and a third information recording medium 703 according to the second example of the present invention. FIG. 7 shows the recording media usable for three different recording densities for the sake of simplicity.

The first information recording medium 701 is an exemplary medium usable for a first recording density D1 among three recording densities. The second information recording medium 702 is an exemplary medium usable for a second recording density D2 among three recording densities. The third information recording medium 703 is an exemplary medium usable for a third recording density D3 among three recording densities. D1, D2 and D3 are different from one other. As in the first example, the first information recording medium 701, the second information recording medium 702 and the third information recording medium 703 each have a sector structure. In this specification, as described above, the minimum unit of recording/reproduction is one sector or a few sectors. Hereinafter, the minimum unit of recording/reproduction will be referred to as the "block", and the number assigned to each block in an ascending order in the recording/reproduction direction will be referred to as the "block block".

The first information recording medium 701, the second information recording medium 702 and the third information recording medium 703 each include a data recording area 704, a first disc information area 705, and a second disc information area 706.

The data recording area 704 includes a user data area 707 in which user data is to be recorded, and a spare area 708. When the user data area 707 has a defect area, the user data which is to be recorded in the defect area is recorded in the spare area 708 instead of a portion of the user data area 707 corresponding to the defect area.

The second disc information area 706 includes a first defect management information area 709 having first defect management information and a second defect management information area 710 having second defect management information, both for managing a defect area (for example, a defect block) existing in the user data area 707 and the spare area 708 having the user data recorded therein instead of the defect area. While defect management is normally performed, the content in the first defect management information and the content in the second defect management information are the same.

As shown in FIG. 7, in the first information recording medium 701 usable for the first recording density D1, the position of the start block of the first defect management information area 709 and the position of the start block of the second defect management information area 710 substantially face each other with reference to the center of the first information recording medium 701.

Similarly, in the second information recording medium 702 usable for the second recording density D2, the position of the start block of the first defect management information area 709 and the position of the start block of the second defect management information area 710 substantially face each other with reference to the center of the second information recording medium 702.

Again similarly, in the third information recording medium 703 usable for the third recording density D3, the position of the start block of the first defect management information area 709 and the position of the start block of the second defect management information area 710 substantially free each other with reference to the center of the third information recording medium 703.

In this specification, as described above, the expression "substantially face" encompasses the case where the angle θ made by the start block of the first defect management information area 709 and the start block of the second defect management information area 710 is 180° and also the case where such an angle θ is not 180° but the information can be recorded to and reproduced from the first defect management information area 709 and the second defect management information area 710 despite one defect. This condition is fulfilled when the angle θ is in the range of $150° \leqq \theta \leqq 210°$.

Where the block number of the start block of the first defect management information area 709 of the first information recording medium 701 is S1, the block number of the start block of the second defect management information area 710 of the first information recording medium 701 is E1, the block number of the start block of the first defect management information area 709 of the second information recording medium 702 is S2, the block number of the start block of the second defect management information area 710 of the second information recording medium 702 is E2, the block number of the start block of the first defect management information area 709 of the third information recording medium 703 is S3, and the block number of the start block of the second defect management information area 710 of the third information recording medium 703 is E3, $E1-S1=E2-S2=E3-S3=N$ (N is a constant natural number).

The principle based on which the above relationship is fulfilled in any information recording media usable for any of n ($n \geqq 3$, n is a natural number) recording densities will be described.

In the first information recording medium 701 usable for the first recording density D1 (mm/block), where an angle made by the start block of the first defect management information area 709 and the start block of the second defect management information area 710 is θ1 (°), the number of blocks existing between the start block of the first defect management information area 709 and the start block of the second defect management information area 710 is N (natural number), and the radial distance of the first defect management information area 709 from the center of the first information recording medium 701 is r (mm), the following relationship is valid.

$$\theta 1=(D1\times N)/(2\pi\times r)\times 360(\mathrm{Mod}360) \quad (1)$$

Similarly, in the second information recording medium 702 usable for the second recording density D2 (mm/block), where an angle made by the start block of the first defect management information area 709 and the start block of the second defect management information area 710 is θ2 (°), the number of blocks existing between the start block of the first defect management information area 709 and the start block of the second defect management information area 710 is N (natural number), and the radial distance of the first defect management information area 709 from the center of the second information recording medium 702 is r (mm), the following relationship is valid.

$$\theta 2=(D2\times N)/(2\pi\times r)\times 360(\mathrm{Mod}360) \quad (2)$$

Again similarly, in the n'th information recording medium usable for the n'th recording density Dn (mm/block), the following relationships are valid.

$$\theta 3=(D3\times N)/(2\pi\times r)\times 360(\mathrm{Mod}360) \quad (3)$$

$$\theta k=(Dk\times N)/(2\pi\times r)\times 360(\mathrm{Mod}360) \quad (k)$$

$$\theta n=(Dn\times N)/(2\pi\times r)\times 360(\mathrm{Mod}360) \quad (n)$$

Here, k is a natural number fulfilling $1 \leqq k \leqq n$ ($n \geqq 3$, n is a natural number).

In order to locate the first defect management information area 709 and the second defect management information area 710 so as to substantially face each other regardless of which of the first to n'th recording densities is used, the number of blocks N which fulfills the relationships of $150° \leqq \theta 1, \theta 2, \ldots, \theta k, \ldots, \theta n \leqq 210°$ is found. Thus, regardless of which of the first to n'th recording densities is used, the first defect management information area 709 and the second defect management information area 710 are located so that the start block of the former is away from the start block of the latter by N blocks.

As long as the information recording medium is usable for any of the first to n'th recording densities, the defect management information areas in such an information recording medium face each other regardless of which of the first to n'th recording densities is used; and it is not necessary to change the defect management method in accordance with the recording density. Owing to such a structure, an information recording medium which is highly reliable and can be handled by an easy defect management method is provided.

SPECIFIC EXAMPLE 2

Next, the information recording medium according to the second example will be described by way of a specific example with reference to FIG. 7. In the specific example 2, n=3.

The first recording density D1 was 66.4 mm/block, the second recording density D2 was 72.7 mm/block, the third recording density D3 was 77.0 mm/block, and the radial distance r was 58 mm. In this case, the expressions (1), (2) and (3) mentioned above are as follows:

$$\theta 1=(66.4\times N)/(2\pi\times 58)\times 360(\mathrm{Mod}360) \quad (1'')$$

$$\theta 2=(71.7\times N)/(2\pi\times 58)\times 360(\mathrm{Mod}360) \quad (2'')$$

$$\theta 3=(77.0\times N)/(2\pi\times 58)\times 360(\mathrm{Mod}360) \quad (3'')$$

θ1, θ2 and θ3 were obtained from expressions (1"), (2"), and (3"), with the range of N being 1 through 200.

Figure 8:
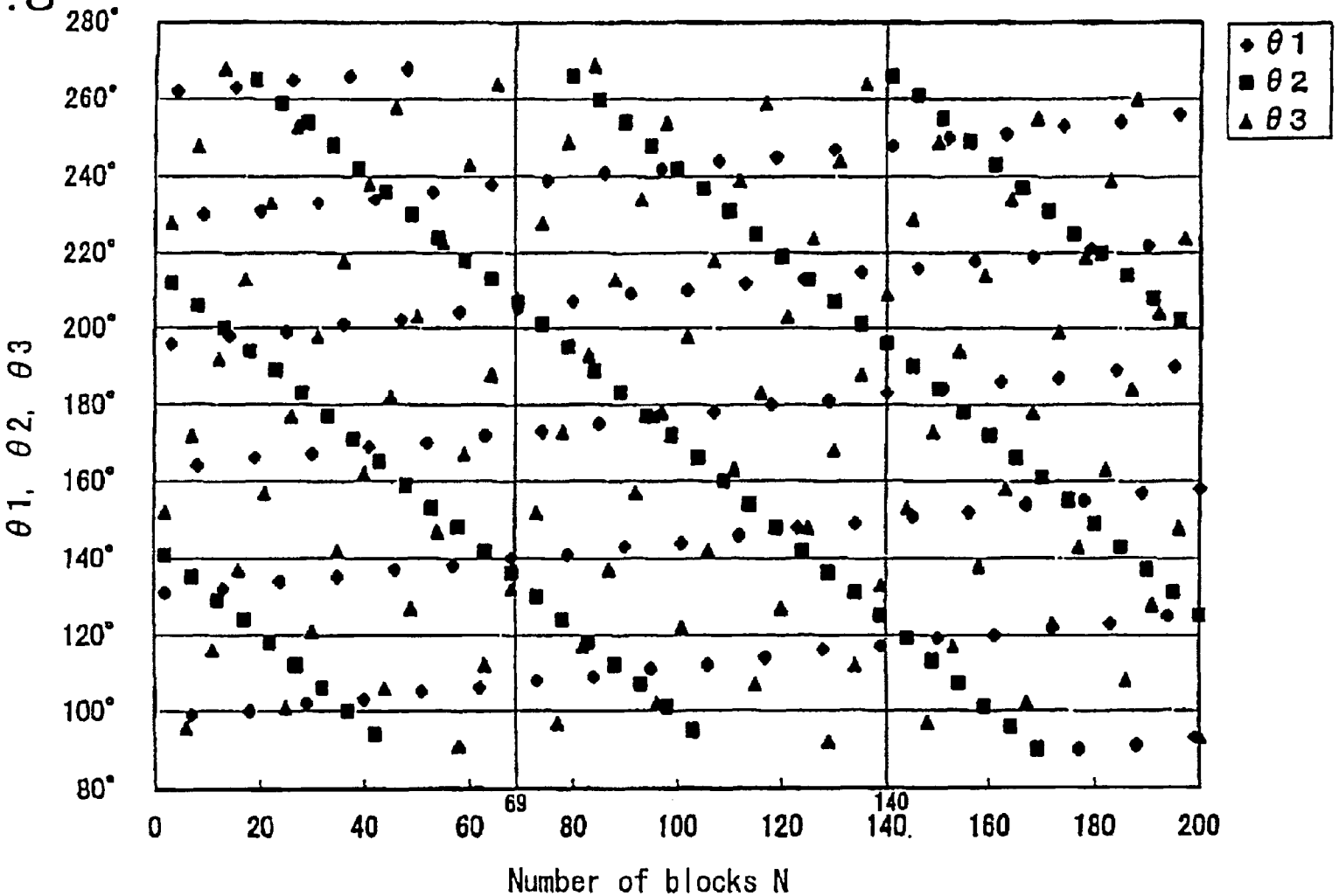
FIG. 8 is a graph illustrating the relationship between the number of blocks N, and θ1, θ2 and θ3 according to the second example of the present invention.
Figure 9:
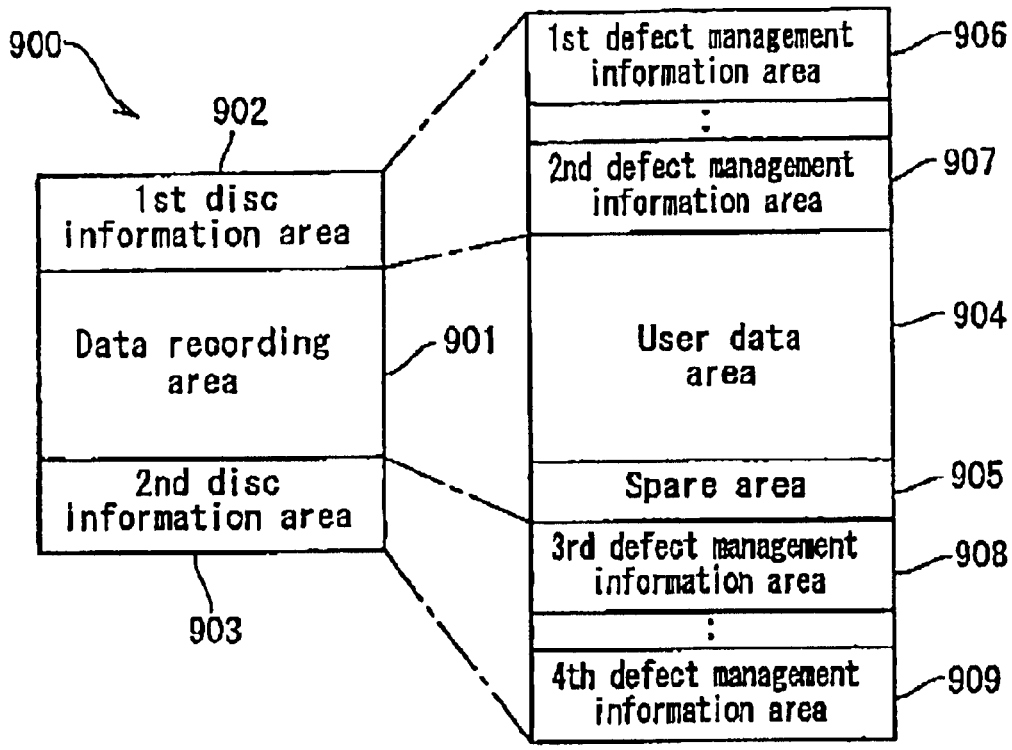
FIG. 9 CONVENTIONAL ART
FIG. 9 shows a logical structure of a conventional information recording medium 900.
Figure 10:
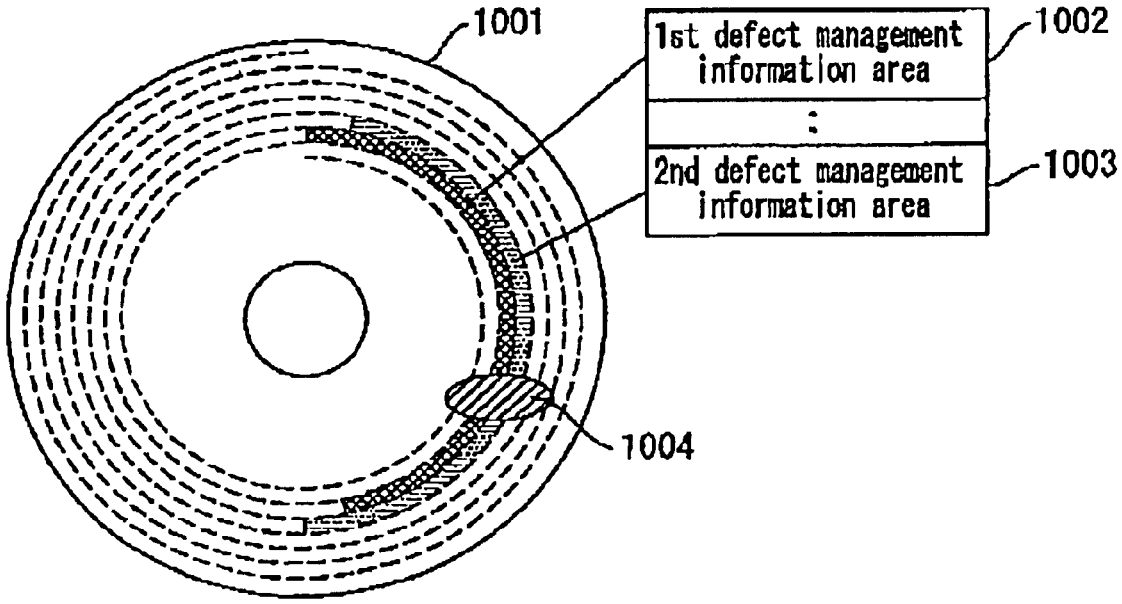
FIG. 10 CONVENTIONAL ART
FIG. 10 is a schematic view of a conventional information recording medium 1001.
Figure 11:
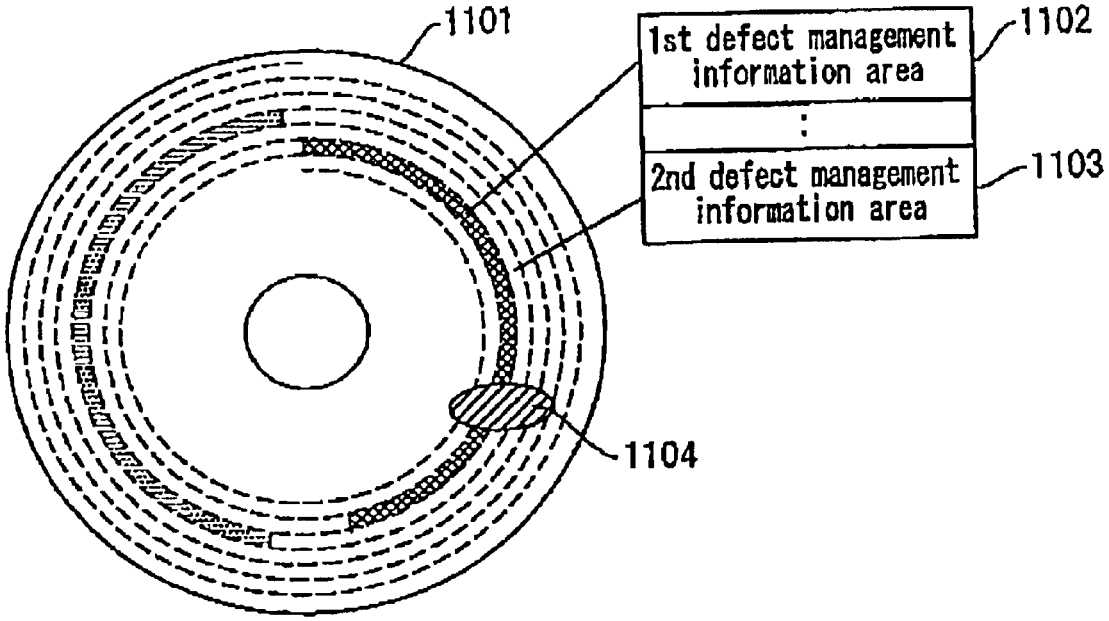
CONVENTIONAL ART FIG. 11
FIG. 11 is a schematic view of another conventional information recording medium 1101.

FIG. 8 is a graph illustrating the relationship between the number of blocks N, and θ1, θ2 and θ3 according to the second example. More specifically, FIG. 8 shows θ1 (♦) fulfilling 90°≦1≦270°, θ2 (■) fulfilling 90°≦θ2≦270°, and θ3 (▲) fulfilling 90°≦θ3≦270° plotted when N is in the range of 1 through 200. From FIG. 8, it was found that the relationships of 150°≦θ1≦210°, 150°≦θ2<210° and 150°≦θ3≦210° are fulfilled when the number of blocks N is 69 and 140.

Accordingly, when the number of blocks N existing between the start block of the first defect management information area 709 and the start block of the second defect management information area 710 is 69 or 140, the first defect management information area 709 and the second defect management information area 710 substantially face each other whichever of the first recording density (D1=66.4 mm/block), the second recording density (D2=71.7 mm/block) or the third recording density (D3=77.0 mm/block) is used.

In the specific example 2, N is in the range of 1 through 200, but N is not limited to this range. Even when N exceeds 200, the number of blocks N (N>200) which fulfills the relationships of 150°≦θ1≦210°, 150°≦θ2≦210° and 150°≦θ3≦210° can be obtained by finding θ1, θ2 and θ3 in a similar manner.

A recording and reproduction apparatus for recording information on the information recording medium according to the second example and/or reproducing information recorded on the information recording medium is identical to the recording and reproduction apparatus 300 described with reference to FIG. 3 in the first example, and will not be described below. There production processing procedure, recording processing procedure, and defect management processing procedure for the information recording medium in the second example are also identical to those described in the first example with reference to FIGS. 4, 5 and 6, and will not be described below.

An information recording medium according to the present invention is usable for either a first recording density D1 or a second recording density D2 among a plurality of recording densities including the first recording density D1 and the second recording density D2. The information recording medium includes a user data area in which user data is to be recorded; a first defect management information area in which first defect management information is to be recorded, the first defect management information being for managing a defect area existing in the user data area; and a second defect management information area in which second defect management information is to be recorded, the second defect management information having an identical content to that of the first defect management information. Regardless of whether the first recording density D1 or the second recording density D2 is used, the first defect management information area and the second defect management information area are located so as to fulfill the relationships of 150°≦θ1≦210° and 150°θ2≦210°. Here, $$\theta 1=(D1\times N)/(2\pi\times r)\times 360(\mathrm{Mod}360) \quad (1), \text{ and}$$

$$\theta 2=(D2\times N)/(2\pi\times r)\times 360(\mathrm{Mod}360) \quad (2).$$

θ1 is an angle made by a start block of the first defect management information area and a start block of the second defect management information area when the user data is recorded in the user data area at the first recording density D1. θ2 is an angle made by the start block of the first defect management information area and the start block of the second defect management information area when the user data is recorded in the user data area at the second recording density D2. N is a number of blocks existing between the start block of the first defect management information area and the start block of the second defect management information area, N being a natural number. r is a radial distance of the first defect management information area from the center of the information recording medium.

The first defect management information area and the second defect management information area are located so as to face each other in the information recording medium. Therefore, even when the information recording medium has a defect area, information can normally be recorded in or reproduced from at least one of the defect management information areas. This improves the reliability of the information recorded in the user data area. Since the defect management information areas are located at fixed positions regardless of the recording density, it is not necessary to change the defect management method in accordance with the recording density. This facilitates the defect management processing.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording medium usable for either a first recording density D1 or a second recording density D2 among a plurality of recording densities including the first recording density D1 and the second recording density D2, the information recording medium comprising:

a user data area in which user data is to be recorded;

a first defect management information area in which first defect management information is to be recorded, the first defect management information being for managing a defect area existing in the user data area; and a second defect management information area in which second defect management information is to be recorded, the second defect management information having an identical content to that of the first defect management information, wherein:

the first defect management information area and the second defect management information area are located so as to fulfill the relationships of $150° \leqq \theta 1 \leqq 210°$ and $150° \leqq \theta 2 \leqq 210°$, where:

$$\theta 1 = (D1 \times N)/(2\pi \times r) \times 360 (\mathrm{Mod}360) \quad (1),$$

$$\theta 2 = (D2 \times N)/(2\pi \times r) \times 360 (\mathrm{Mod}360) \quad (2),$$

$\theta 1$ is an angle made by a start block of the first defect management information area and a start block of the second defect management information area when the user data is recorded in the user data area at the first recording density D1, $\theta 2$ is an angle made by the start block of the first defect management information area and the start block of the second defect management information area when the user data is recorded in the user data area at the second recording density D2, N is a number of blocks existing between the start block of the first defect management information area and the start block of the second defect management information area, N being a natural number, and r is a radial distance of the first defect management information area from the center of the information recording medium.

2. An information recording medium according to claim 1, wherein the first recording density D1 is 75 mm/block, the second recording density D2 is 80 mm/block, and the radial distance r is 60 mm.

3. An information recording medium according to claim 1, wherein an absolute value of the ratio of the difference between the first recording density D1 and the second recording density D2, with respect to the first recording density D1, is 0.05 to 0.1.

4. An apparatus for recording information on an information recording medium, the information being recorded at either a first recording density D1 or a second recording density D2 among a plurality of information densities including the first recording density D1 and the second recording density D2, the information recording medium comprising:

a user data area in which user data is to be recorded;

a first defect management information area in which first defect management information is to be recorded, the first defect management information being for managing a defect area existing in the user data area; and a second defect management information area in which second defect management information is to be recorded, the second defect management information having an identical content to that of the first defect management information, wherein:

the first defect management information area and the second defect management information area are located so as to fulfill the relationships of $150° \leqq \theta 1 \leqq 210°$ and $150° \leqq \theta 2 \leqq 210°$, where:

$$\theta 1 = (D1 \times N)/(2\pi \times r) \times 360 (\mathrm{Mod}360) \quad (1),$$

$$\theta 2 = (D2 \times N)/(2\pi \times r) \times 360 (\mathrm{Mod}360) \quad (2),$$

$\theta 1$ is an angle made by a start block of the first defect management information area and a start block of the second defect management information area when the user data is recorded in the user data area at the first recording density D1, $\theta 2$ is an angle made by the start block of the first defect management information area and the start block of the second defect management information area when the user data is recorded in the user data area at the second recording density D2, N is a number of blocks existing between the start block of the first defect management information area and the start block of the second defect management information area, N being a natural number, and r is a radial distance of the first defect management information area from the center of the information recording medium, the apparatus comprising:

a head section for recording the information on and reproducing the information from the information recording medium; and a control section for controlling an operation of the head section, wherein:

the control sections controls the operation of the head section, such that the head section reproduces the first defect management information from the first defect management information area, moves by the number of blocks N from the start block of the first defect management information area, and reproduces the second defect management information from the second defect management information area, and the control section specifies defect management information to be used, among the first defect management information and the second defect management information, and controls the operation of the head section such that the head section records the user data in the user data area based on the specified defect management information.

5. An apparatus according to claim 4, wherein the control section determines whether or not there is another defect area in the user data area; and when determining that there is another defect area, the control section updates the defect management information and controls the operation of the head section such that the head section records the user data in a portion of the user data area which is different from the another defect area, based on the updated defect management information.

6. An apparatus for reproducing information recorded on an information recording medium, the information being recorded at either a first recording density D1 or a second recording density D2 among a plurality of recording densities including the first recording density D1 and the second recording density D2, the information recording medium comprising:

a user data area in which user data is to be recorded;

a first defect management information area in which first defect management information is to be recorded, the first defect management information being for managing a defect area existing in the user data area; and a second defect management information area in which second defect management information is to be recorded, the second defect management information having an identical content to that of the first defect management information, wherein:

the first defect management information area and the second defect management information area are located so as to fulfill the relationships of $150° \leqq \theta 1 \leqq 210°$ and $150° \leqq \theta 2 \leqq 210°$, where:

$$\theta 1 = (D1 \times N)/(2\pi \times r) \times 360 (\mathrm{Mod}360) \quad (1),$$

$$\theta 2 = (D2 \times N)/(2\pi \times r) \times 360 (\mathrm{Mod}360) \quad (2),$$

$\theta 1$ is an angle made by a start block of the first defect management information area and a start block of the second defect management information area when the user data is recorded in the user data area at the first recording density D1, $\theta 2$ is an angle made by the start block of the first defect management information area and the start block of the second defect management information area when the user data is recorded in the user data area at the second recording density D2, N is a number of blocks existing between the start block of the first defect management information area and the start block of the second defect management information area, N being a natural number, and r is a radial distance of the first defect management information area from the center of the information recording medium, the apparatus comprising:

a head section for reproducing the information recorded on the information recording medium; and a control section for controlling an operation of the head section, wherein:

the control section controls the operation of the head section, such that the head section reproduces the first defect management information from the first defect management information area, moves by the number of blocks N from the start block of the first defect management information area, and reproduces the second defect management information from the second defect management information area, and the control section specifies defect management information to be used, among the first defect management information and the second defect management information, and controls the operation of the head section such that the head section reproduces the user data from the user data area based on the specified defect management information.

7. A method for recording information on an information recording medium, the information being recorded at either a first recording density D1 or a second recording density D2 among a plurality of recording densities including the first recording density D1 and the second recording density D2, the information recording medium comprising:

a user data area in which user data is to be recorded;

a first defect management information area in which first defect management information is to be recorded, the first defect management information being for managing a defect area existing in the user data area; and a second defect management information area in which second defect management information is to be recorded, the second defect management information having an identical content to that of the first defect management information, wherein:

the first defect management information area and the second defect management information area are located so as to fulfill the relationships of $150° \leqq \theta 1 \leqq 210°$ and $150° \leqq \theta 2 \leqq 210°$, where:

$$\theta 1 = (D1 \times N)/(2\pi \times r) \times 360 (\mathrm{Mod}360) \quad (1),$$

$$\theta 2 = (D2 \times N)/(2\pi \times r) \times 360 (\mathrm{Mod}360) \quad (2),$$

$\theta 1$ is an angle made by a start block of the first defect management information area and a start block of the second defect management information area when the user data is recorded in the user data area at the first recording density D1, $\theta 2$ is an angle made by the start block of the first defect management information area and the start block of the second defect management information area when the user data is recorded in the user data area at the second recording density D2, N is a number of blocks existing between the start block of the first defect management information area and the start block of the second defect management information area, N being a natural number, and r is a radial distance of the first defect management information area from the center of the information recording medium, the method comprising the steps of:

reproducing the first defect management information from the first defect management information area;

moving the head section, for recording information on and reproducing information from the information recording medium, by the number of blocks N from the start block of the first defect management information area;

reproducing the second defect management information from the second defect management information area;

specifying the defect management information to be used, among the first defect management information and the second defect management information; and recording the user data in the user data area based on the specified defect management information.

8. A method according to claim 7, wherein the step of recording includes the steps of:

determining whether or not there is another defect area in the user data area;

updating the defect management information when it is determined that there is another defect area; and recording the user data in a portion of the user data area which is different from the another defect area, based on the updated defect management information.

9. A method for reproducing information recorded on an information recording medium, the information being recorded at either a first recording density D1 or a second recording density D2 among a plurality of recording densities including the first recording density D1 and the second recording density D2, the information recording medium comprising:

a user data area in which user data is to be recorded;

a first defect management information area in which first defect management information is to be recorded, the first defect management information being for managing a defect area existing in the user data area; and a second defect management information area in which second defect management information is to be recorded, the second defect management information having an identical content to that of the first defect management information, wherein:

the first defect management information area and the second defect management information area are located so as to fulfill the relationships of $150° \leqq \theta 1 \leqq 210°$ and $150° \leqq \theta 2 \leqq 210°$, where:

$$\theta 1 = (D1 \times N)/(2\pi \times r) \times 360 (\mathrm{Mod}360) \quad (1),$$

$$\theta 2 = (D2 \times N)/(2\pi \times r) \times 360 (\mathrm{Mod}360) \quad (2),$$

$\theta 1$ is an angle made by a start block of the first defect management information area and a start block of the second defect management information area when the user data is recorded in the user data area at the first recording density D1, $\theta 2$ is an angle made by the start block of the first defect management information area and the start block of the second defect management information area when the user data is recorded in the user data area at the second recording density D2, N is a number of blocks existing between the start block of the first defect management information area and the start block of the second defect management information area, N being a natural number, and r is a radial distance of the first defect management information area from the center of the information recording medium, the method comprising the steps of:

reproducing the first defect management information from the first defect management information area;

moving the head section, for reproducing information recorded on the information recording medium, by the number of blocks N from the start block of the first defect management information area;

reproducing the second defect management information from the second defect management information area;

specifying the defect management information to be used, among the first defect management information and the second defect management information; and reproducing the user data from the user data area based on the specified defect management information.

10. A defect management method for managing a defect area existing in an information recording medium, which is usable for either a first recording density D1 or a second recording density D2 among a plurality of recording densities including the first recording density D1 and the second recording density D2, the information recording medium comprising:

a user data area in which user data is to be recorded;

a first defect management information area in which first defect management information is to be recorded, the first defect management information being for managing a defect area existing in the user data area; and a second defect management information area in which second defect management information is to be recorded, the second defect management information having an identical content to that of the first defect management information, wherein:

the first defect management information area and the second defect management information area are located so as to fulfill the relationships of $150° \leqq \theta 1 \leqq 210°$ and $150° \leqq \theta 2 \leqq 210°$, where:

$$\theta 1 = (D1 \times N)/(2\pi \times r) \times 360 (\mathrm{Mod}360) \quad (1),$$

$$\theta 2 = (D2 \times N)/(2\pi \times r) \times 360 (\mathrm{Mod}360) \quad (2),$$

$\theta 1$ is an angle made by a start block of the first defect management information area and a start block of the second defect management information area when the user data is recorded in the user data area at the first recording density D1, $\theta 2$ is an angle made by the start block of the first defect management information area and the start block of the second defect management information area when the user data is recorded in the user data area at the second recording density D2, N is a number of blocks existing between the start block of the first defect management information area and the start block of the second defect management information area, N being a natural number, and r is a radial distance of the first defect management information area from the center of the information recording medium, the defect management method comprising the steps of:

updating defect management information;

recording the updated defect management information in the first defect management information area as the first defect management information;

moving the head section, for recording information on and reproducing information from the information recording medium, by the number of blocks N from the start block of the first defect management information area; and recording the updated defect management information in the second defect management information area as second defect management information.

11. A defect management method according to claim 10, wherein the first recording density D1 is 75 mm/block, the second recording density D2 is 80 mm/block, and the radial distance r is 60 mm.

12. A defect management method according to claim 10, wherein an absolute value of the ratio of the difference between the first recording density D1 and the second recording density D2, with respect to the first recording density D1, is 0.05 to 0.1.

*13. A method for determining a location of a defect management area of an information recording medium,*

*the information recording medium comprising:*

*a user data area in which user data is to be recorded;*

*a first defect management information area in which first defect management information is to be recorded, the first defect management information being for managing a defect area existing in the user data area; and*

*a second defect management information area in which second defect management information is to be recorded, the second defect management information having an identical content to that of the first defect management information;*

*wherein:*

*$\theta 1$ is an angle made by a start block of the first defect management information area and a start block of the second defect management information area when the user data is recorded in the user data area at a first recording density D1,*

*$\theta 2$ is an angle made by the start block of the first defect management information area and the start block of the second defect management information area when the*

*user data is recorded in the user data area at a second recording density D2,*

*N is a number of blocks existing between the start block of the first defect management information area and the start block of the second defect management information area, N being a natural number,*

*N in a first information recording medium recorded at the first recording density D1 and N in a second information recording medium recorded at the second recording density D2 are the same value, and*

*the location of the first defect management information area and the location of the second defect management information area in the first information recording medium and the second information recording medium are determined so as to satisfy the relationships of* $150° < \theta 1 < 210°$ *and* $150° < \theta 2 < 210°$.

*14. A method for reproducing data recorded on an information recording medium in which a location of a defect management area is determined by the method according to claim 13,*

*the method comprising:*

*reproducing the first defect management information from the first defect management area; or*

*reproducing the second defect management information from the second defect management area.*

*15. A method for recording data on an information recording medium in which a location of a defect management area is determined by the method according to claim 13,*

*the method comprising:*

*recording the first defect management information on the first defect management area; or*

*recording the second defect management information on the second defect management area.*

* * * * *